US012644601B1

(12) United States Patent
Snyder et al.

(10) Patent No.: US 12,644,601 B1
(45) Date of Patent: Jun. 2, 2026

(54) OPTIMIZED ADVANCED RQL COMBUSTOR FOR NVPM AND NOX

(71) Applicant: RTX Corporation, Farmington, CT (US)

(72) Inventors: Timothy Snyder, Glastonbury, CT (US); Dibesh Joshi, South Windsor, CT (US); Robert Sonntag, Bolton, CT (US); Miguel Negron Lopez, Camuy, PR (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/093,596

(22) Filed: Mar. 28, 2025

(51) Int. Cl.
*F23R 3/06* (2006.01)
*F23R 3/00* (2006.01)
*F23R 3/10* (2006.01)
*F23R 3/28* (2006.01)

(52) U.S. Cl.
CPC ................ *F23R 3/06* (2013.01); *F23R 3/002* (2013.01); *F23R 3/10* (2013.01); *F23R 3/28* (2013.01); *F05D 2270/08* (2013.01)

(58) Field of Classification Search
CPC .... F23R 3/002; F23R 3/04; F23R 3/06; F23R 3/10; F23R 3/425; F23R 3/44; F23R 3/46; F23R 3/50; F23R 3/52; F23R 3/54; F05D 2270/08; F05D 2270/081; F05D 2270/082
See application file for complete search history.

(56) References Cited

U.S. PATENT DOCUMENTS

| | | | | | |
|---|---|---|---|---|---|
| 3,986,347 | A * | 10/1976 | Schirmer | F02C 7/08 | 60/39.23 |
| 7,093,441 | B2 * | 8/2006 | Burd | F23R 3/002 | 60/754 |
| 7,954,325 | B2 * | 6/2011 | Burd | F23R 3/04 | 60/752 |
| 10,197,279 | B2 * | 2/2019 | Boardman | F23R 3/286 | |
| 10,337,738 | B2 * | 7/2019 | Boardman | F23R 3/14 | |
| 11,143,407 | B2 * | 10/2021 | Hoke | F23R 3/50 | |
| 11,668,462 | B1 * | 6/2023 | Benjamin | F23R 3/06 | 60/752 |
| 11,732,659 | B2 | 8/2023 | Swann et al. | | |
| 12,104,795 | B2 * | 10/2024 | Ganiger | F23R 3/42 | |
| 12,130,016 | B1 | 10/2024 | Nath et al. | | |
| 12,169,068 | B2 | 12/2024 | Zelina et al. | | |
| 12,241,629 | B2 * | 3/2025 | Swann | F02C 9/28 | |
| 2007/0125093 | A1 * | 6/2007 | Burd | F23R 3/04 | 60/752 |
| 2011/0219774 | A1 * | 9/2011 | Bronson | F23R 3/50 | 60/752 |

(Continued)

*Primary Examiner* — Alain Chau
(74) *Attorney, Agent, or Firm* — Kinney & Lange, P.A.

(57) ABSTRACT

A combustor for rich-quench-lean combustion includes a combustor shell, a combustion chamber delimited by the combustor shell, and fuel injectors. The combustion chamber includes a primary zone, a quench zone, a secondary zone, and an outlet arranged in axial flow series. Openings through the combustor in the quench zone provide a quench air flow into the quench zone. A method for rich-quench-lean combustion for the combustor includes contemporaneously injecting a rich air-fuel mixture into the primary zone and injecting a second air flow into the quench zone in which the second air flow is equal to or less than four times the primary air flow.

17 Claims, 4 Drawing Sheets

(56) References Cited

U.S. PATENT DOCUMENTS

| | | | | |
|---|---|---|---|---|
| 2011/0271678 | A1* | 11/2011 | Bourgois | F23R 3/10 60/722 |
| 2012/0186222 | A1* | 7/2012 | Commaret | F23R 3/26 60/39.827 |
| 2016/0123596 | A1* | 5/2016 | Hoke | F23R 3/06 60/746 |
| 2017/0370584 | A1* | 12/2017 | Boardman | F23R 3/286 |
| 2017/0370585 | A1* | 12/2017 | Boardman | F23R 3/14 |
| 2023/0072621 | A1* | 3/2023 | Swann | F23R 3/06 |
| 2023/0250961 | A1* | 8/2023 | Ganiger | F23R 3/002 60/752 |
| 2024/0027066 | A1* | 1/2024 | Nath | F23R 3/50 |
| 2024/0209801 | A1 | 6/2024 | Madden et al. | |

* cited by examiner

OPTIMIZED ADVANCED RQL COMBUSTOR FOR NVPM AND NOX

STATEMENT OF GOVERNMENT INTEREST

This invention was made with government support under Contract No. 80GRC022CA008 awarded by the National Aeronautics and Space Administration (NASA). The government has certain rights in the invention.

BACKGROUND

The present disclosure relates generally to combustors for gas turbine engines, and more particularly, to reducing non-volatile particulate matter (nvPM) produced by rich-quench-lean ("RQL") combustion.

Rich-quench-lean ("RQL") combustion is characterized by burning a rich air-fuel mixture in a primary zone that is mixed with a quenching flow to produce a lean air-fuel mixture within a secondary zone. The primary zone's rich-burn promotes combustion stability and reduces flame temperature, which improves operational life of the combustor. Rapid mixing and subsequent lean burn within the secondary zone reduce nvPM formation. While the reduction of nvPM from conventional RQL combustion is beneficial, the reduction of nvPM from lean premixed combustion technologies is more substantial than current RQL combustion technologies. Further reduction of nvPM emissions from RQL combustion is highly desirable to reduce environmental impact from gas turbine engine operation, particularly for aircraft, while retaining the benefits of RQL combustion.

SUMMARY

A combustor according to an example embodiment of this disclosure includes a combustor shell delimiting a combustion chamber. The combustor chamber includes, in axial flow series, a primary zone, a quench zone, a secondary zone, and an outlet. Openings extend through the combustor shell within the quench zone to define a quench discharge area. Fuel injectors fluidly communicate with the primary zone and collectively define a net fuel discharge area and a net air discharge area. The quench discharge area and the net air discharge are configured to provide equal to or less than 4.0 times more quench air flow than primary air flow.

A method for rich-quench-lean combustion within a combustor, according to another example embodiment of this disclosure, includes injecting a first fuel mass flow rate of a hydrocarbon fuel and a first air mass flow rate into a primary zone of the combustor. The first fuel mass flow rate and the first air mass flow rate define a rich air-fuel ratio. The method further includes injecting a second air mass flow rate into a quench zone of the combustor contemporaneously with injecting the first fuel mass flow rate and the first air mass flow rate. The second air mass flow rate is equal to or less than 4.0 times the first air mass flow rate.

DETAILED DESCRIPTION

Figure 1:
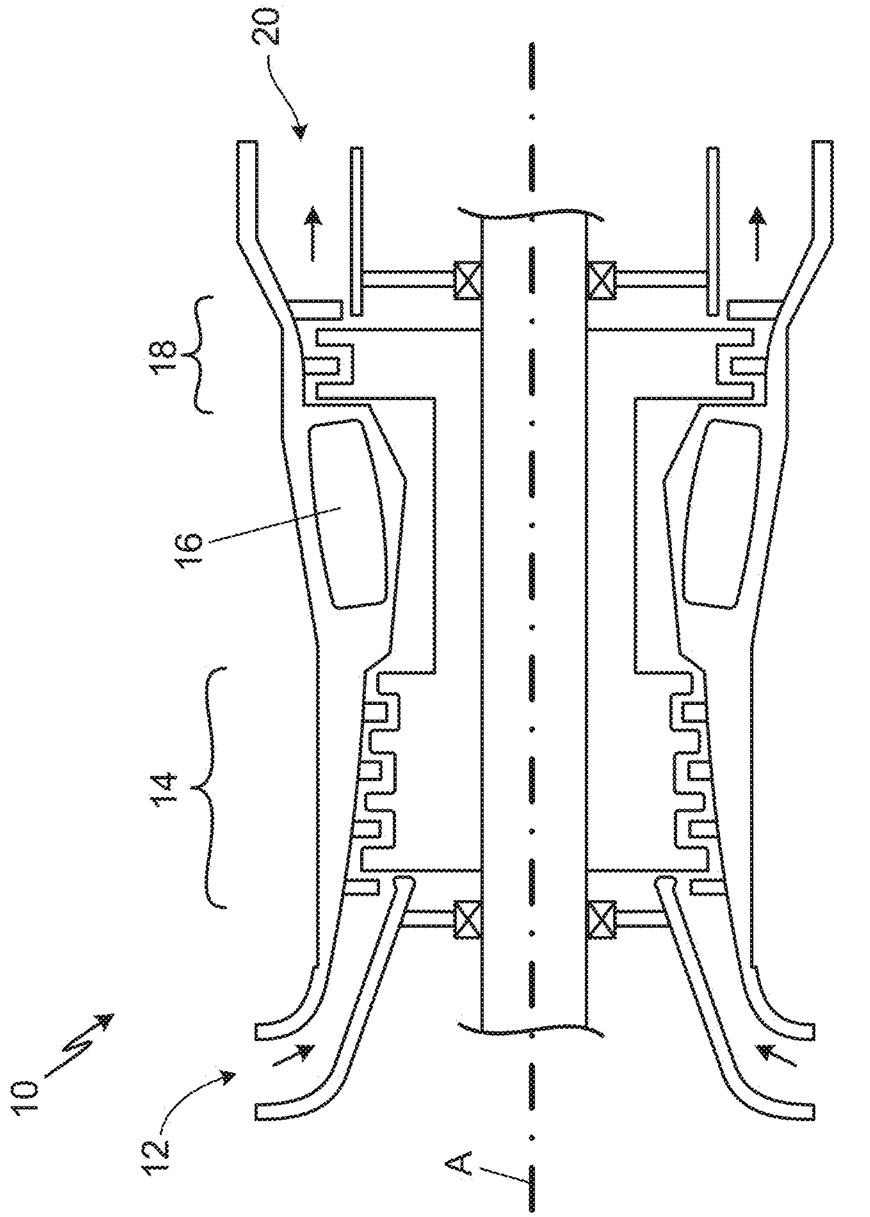
FIG. 1 is a schematic representation of a gas turbine engine.

FIG. 1 is a schematic cross-sectional view of gas turbine engine 10, which is depicted with single spool architecture. In other examples, gas turbine engine 10 can be configured with two spools (e.g., a dual-spool architecture), or more than two spools (e.g., a power turbine or a topping cycle spool non-concentrically arranged with respect to one or more primary spools). Gas turbine engine 10 can be configured as a propulsion engine, for example, a turbofan engine, a turboprop engine, or a turboshaft engine. In other examples, gas turbine engine 10 can be an industrial gas turbine engine driving a load (e.g., an electric machine). The architecture of gas turbine engine 10 depicts a forward-to-aft main gas flow path in which the engine ingests air into a forward portion of the engine that flows aft through the compressor section, the combustor, and the turbine section before discharging from an aft portion of the engine. In other examples, gas turbine engine 10 can have a reverse-flow architecture in which the engine ingests air into an aft portion of the engine that flows forward through the compressor section, the combustor, and the turbine section before discharging through an exhaust at a forward portion of the engine. Each compressor section and/or turbine section can have one or more stages. Each stage can include at least one rotor of circumferentially spaced blades and at least one stator of circumferentially spaced and stationary vanes. As depicted, gas turbine 10 includes multiple compressor stages and multiple turbine stages. However, other examples of gas turbine engine 10 can have more stages or less stages than the number of compressor stages and/or turbine stages depicted by FIG. 1.

As depicted in FIG. 1, gas turbine engine 10 includes, in serial flow communication, air inlet 12, compressor section 14, combustor 16, turbine section 18, and exhaust section 20. Compressor section 14 pressurizes air entering gas turbine engine 10 through air inlet 12. The pressurized air discharged from compressor section 14 mixes with fuel inside combustor 16. Igniters initiate combustion of the air-fuel mixture within combustor 16, which is sustained by a continuous supply of fuel and pressurized air and/or igniter activation. A heated and compressed air stream discharges through turbine section 18 and exhaust section 20. Turbine section 18 extracts energy from the exhaust stream to drive compressor section 14 and other engine accessories such as electrical generators and pumps for lubrication, fuel, and/or actuators.

Figure 2:
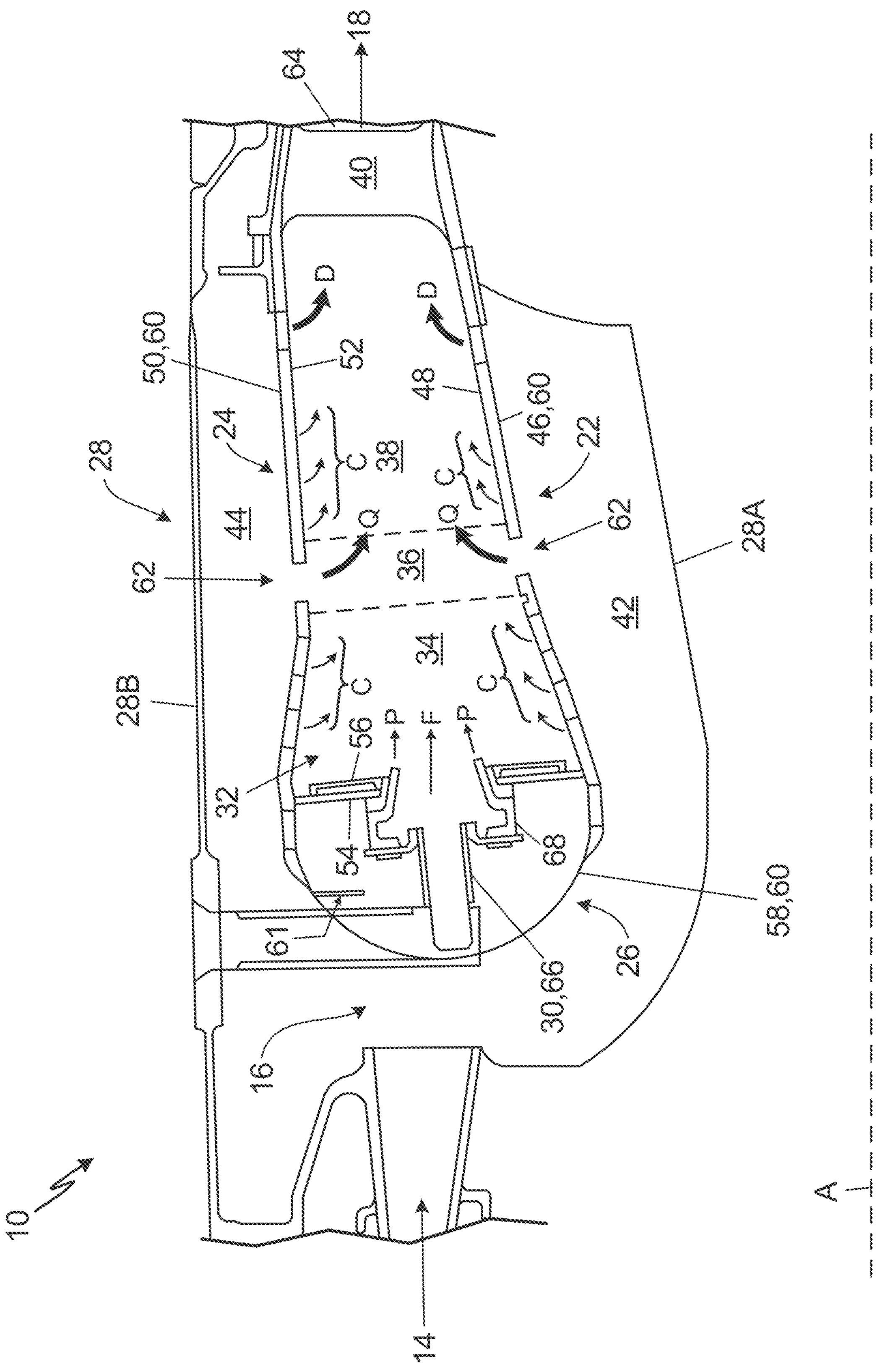
FIG. 2 is a cross-section of a combustor configured for rich-quench-lean combustion.

FIG. 2 is a schematic cross-sectional view of an example combustor of gas turbine engine 10 that can be configured for rich-quench-lean (RQL) combustion. While a particular configuration of combustor 16 is illustrated and described below, other combustor types with various other details and configurations will benefit from the proposed rich-quench-lean combustion process described herein. As depicted, combustor 16 includes inner combustor liner assembly 22, outer combustor liner assembly 24, forward assembly 26, case module 28, and one or more injectors 30. Inner combustor liner assembly 22 and outer combustor liner assembly 24 are spaced radially to define combustion chamber 32, which has an annular cross-sectional shape with respect to engine axis A.

Combustion chamber 32 includes, in axial flow series, primary zone 34, quench zone 36, secondary zone 38, and outlet 40. Primary zone 34 extends from forward assembly 26 to quench zone 36, and secondary zone 38 extends from quench zone 36 to outlet 40. Quench zone 36 is disposed between primary zone 34 and secondary zone 38. In operation, combustor 16 is configured to achieve a rich air-fuel ratio within primary zone 34 which transitions to a lean air-fuel ratio within secondary zone 38 by mixing air with the primary zone flow passing through quench zone 36.

Inner combustor liner assembly 22 is radially outward from inner case 28A of case module 28 to define inner annular plenum 42. Outer combustor liner assembly 24 is radially inward from outer case 28B of case module 28 to define outer annular plenum 44. Forward assembly 26 spans between and connects inner combustor liner assembly 22 to outer combustor liner assembly 24 and is located downstream from an inlet of combustor 16, which communicates with compressor section 14.

Inner combustor liner assembly 22 includes inner support shell 46 and one or more inner liner panels 48. Outer combustor liner assembly 24 includes outer support shell 50 and one or more outer liner panels 52. Forward assembly 26 includes bulkhead shell 54, one or more bulkhead liner panels 56, and annular hood 58. Inner liner panels 48 and outer liner panels 52 are circumferentially spaced and/or axially spaced to define an annular boundary to combustion chamber 32. Inner support shell 46 and outer support shell 50 are connected to inner liner panels 48 and outer liner panels 52 respectively to provide support thereto. Annular hood 58 extends between and is secured to forward-most ends of inner support shell 46 and outer support shell 50. Annular hood 58, inner support shell 46, and outer support shell 50 collectively form combustor shell 60. Openings 61 extend through annular hood 58 for receiving injectors 30 and receiving a portion of air from compressor section 14 within forward assembly 26. At opposite, downstream-most ends, inner support shell 46 and outer support shell 50 join to inlet guide vane assembly 64, which includes an array of circumferentially spaced stationary vanes. The cumulative open area between the stationary guide vanes defines outlet 40 of combustor 16, which communicates with turbine section 18.

Combustor 16 includes multiple injectors 30 circumferentially spaced about engine axis A at forward assembly 26. Injectors 30 can include fuel nozzles 66 and swirlers 68 as depicted by FIG. 2. Fuel nozzles 66 can be supported from outer case 28B and extend radially inward through respective openings 61 in annular hood 58 to direct fuel through openings formed by bulkhead shell 54 and bulkhead liner panels 56. Swirlers 68 circumscribe respective fuel nozzles 66. Bulkhead shell 54 and/or stems of injectors 30 can support respective swirlers 68 with respect to fuel nozzles 66. A net fuel discharge area of injectors 30 is the summation of the flow-limiting areas of each fuel nozzle discharge passage, and a net air discharge area of injectors 30 is the summation of flow-limiting areas of each swirler 68. For a given range of operational fuel pressure and plenum pressure of gas turbine engine 10, the net fuel discharge area and the net air discharge area of injectors 30 can be varied to achieve a rich air-fuel mixture within primary zone 34.

Fuel directed through nozzles 66 and air directed through swirlers 68 provide an air-fuel mixture along axis F into primary zone 34 of combustion chamber 32. In some examples, at least some injectors 30 provide a continuous air-fuel mixture along axis F of each operating injector 30. In other examples, all injectors 30 provide a continuous air-fuel mixture along axis F of rejective injectors. The portion of air introduced into primary zone 34 via swirlers 68 is referred to as primary air flow P. The combined air flows from primary air flow P as well as primary zone cooling flow C, if any, as well as the fuel flow F from nozzle 66 defines the primary zone flow.

Igniters (not shown) are supported from outer case 28B and extend through outer combustor liner assembly 24 to communicate with combustion chamber 32. Igniters are downstream relative to injectors 30 such that igniters are disposed between the axial locations of injectors 30 and quench zone 36 along engine axis A. Igniters activate to initiate combustion within combustion chamber 32 and deactivate during other phases of gas turbine engine operation.

Outer combustor liner assembly 24 includes openings 62 extending through outer support shell 50 and/or outer liner panels 52 within quench zone 36 to provide quench flow Q. Openings 62 are distributed circumferentially about axis A and, in some examples, may include multiple rows of openings 62 spaced axially along axis A. Openings 62 can be equally distributed or unequally distributed about the circumference of outer combustor liner assembly 24 and/or along axis A to achieve a quench flow distribution through openings 62. Openings are oriented to direct quench flow Q with a primary radial component with respect to engine axis A such that quench flow penetrates and mixes with a flow from primary zone 34. The area summation of openings 62 defines a net quench area, which can be varied in relation to the net fuel discharge area and net air discharge area to achieve a target quench flow relative to the primary air flow P. Additional openings 62 can extend through outer combustor liner assembly 24 and/or inner combustor liner assembly 22 within secondary zone to provide dilution air flow D.

Inner combustor liner assembly 22, outer combustor liner assembly 24, and/or forward assembly 26 can include multiple cooling holes, such as cooling holes 63, that extend through combustor shell 60 and/or through inner liner panels 48, outer liner panels 52, and/or bulkhead liner panels 56 for communicating air from within inner annular plenum 42, outer annular plenum 44, and/or forward assembly 26 into combustion chamber 32 as a distributed cooling flow. The net cooling flow C into combustion chamber 32 from all cooling holes can be distributed among one or more of primary zone 34, quench zone 36, and secondary zone 38.

The air-fuel mixture within combustion chamber 32 can be described by an equivalence ratio, $\lambda$. As used herein, the air-fuel equivalence ratio is the ratio of the air mass flow rate to the fuel mass flow rate divided by the same ratio at the stoichiometry of the reaction considered. The air-fuel mixture within primary zone 34 is configured to include excess fuel relative to a stochiometric mixture of air and fuel (i.e., a rich mixture), which can be expressed by an air-fuel equivalence ratio less than 1.0. The air-fuel mixture within secondary zone 38 is configured to include excess air relative to the stochiometric mixture of air and fuel (i.e., a lean mixture, which can be expressed by an air-fuel equivalence ratio greater than 1.0.

In operation, fuel nozzles 66 inject a mass flow rate of fuel, and swirlers dispense a mass air flow rate of air into primary zone 34 to produce a rich mixture of air and fuel. Initially, igniters initiate combustion of the rich air-fuel mixture within primary zone 34, which becomes self-sustaining after combustion stabilizes within primary zone 34. The total flow from primary zone 34 mixes with air from quench flow Q within quench zone 36 to produce a lean air-fuel mixture within secondary zone 38. Cooling flow C dispensed into combustion chamber 32 mixes with and contributes to the air-fuel mixture in primary zone 34, quench zone 36, and/or secondary zone 38. In some examples, the lean air-fuel mixture is further mixed with dilution air flow D within secondary zone 38 before exiting via outlet 40 into turbine section 18.

Formation of non-volatile particular matter (nvPM) can be reduced by minimizing or optimizing the rich burn duration within primary zone 34. The axial length of primary zone 34 along engine axis A relative to an overall axial length of combustor 16 measured between forward assembly 26 and outlet 40 can be sized such that the primary zone 34 accounts for greater than or equal to eight percent and less than or equal to fifteen percent of the total volume of combustion chamber 32 (i.e., the combined volume of primary zone 34, quench zone 36, and secondary zone 38). The rich burn in such combustors accounts for approximately ten percent of the total combustion duration within combustor 16, or in some examples, equal to or less than ten percent of the total combustion duration within combustor 16. Further, inner combustor liner assembly 22 and outer combustor liner assembly 24 can form a converging annular cross-section within primary zone 34 towards quench zone 36 to accelerate the total primary flow into quench zone 36 and secondary zone 38, further reducing the rich burn duration.

Figure 3:
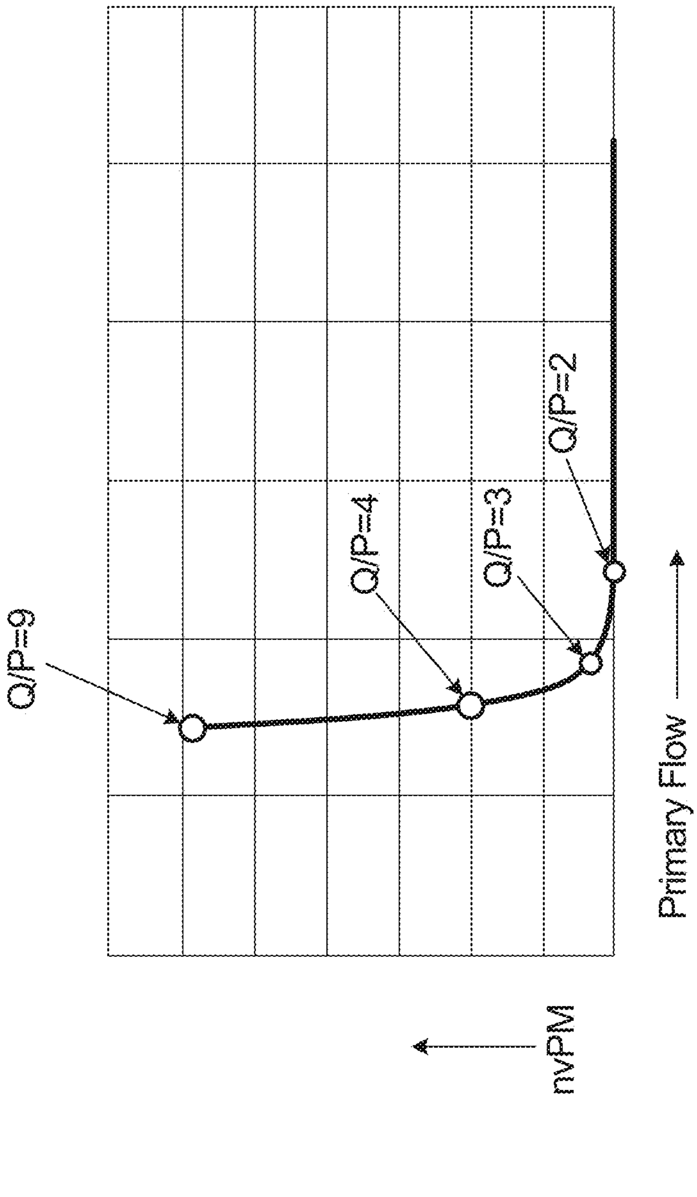
FIG. 3 is a representative plot depicting the relationship between the quantity of non-volatile particulate matter (nvPM) and the ratio of quench air flow to primary air flow.

Formation of nvPM can be further reduced by optimizing a ratio of quench air flow A to primary air flow P, or a quench flow ratio Q/P. FIG. 3 is a plot describing the relationship between primary air flow P and non-volatile particulate matter (nvPM) for a given operational range for quench flow Q. As depicted, nvPM decreases with increasing primary air flow P, which is configured to achieve a rich air-fuel ratio for the operational range of combustor 16. Corresponding decreases of cooling flow F and/or dilution flow D account for the increased primary air flow P. Expressed as the ratio of quench flow Q to primary flow P (i.e., quench flow ratio Q/P), FIG. 3 depicts decreasing nvPM with decreasing quench flow ratio. That is to say, as the proportion of primary air flow P increases relative to quench flow Q, nvPM decreases. With quench ratios less than 2.0, further increases of primary air flow P yields diminishing reductions of nvPM.

Throughout operation of combustor 16, the quench flow ratio Q/P may vary at different power levels of gas turbine engine 10 and, hence, combustor 16 may operate at different proportions of fuel, primary air flow P, and quench flow Q. At least one power level of gas turbine engine 10, combustor 16 can operate within a quench flow ratio range in order to reduce nvPM. For example, combustor 16 can be configured to operate within a target quench flow ratio range during a cruise phase of flight to reduce nvPM production during the majority of a flight cycle. In other examples, combustor 16 may operate entirely within the target quench ratio range.

Referring to FIG. 3, quench ratios equal to or less than 4.0 while maintaining a rich air-fuel ratio within primary zone 34 provide significant reductions of nvPM relative to higher quench flow ratios associated with conventional RQL combustion. In further examples, the quench flow ratio is equal to or less than 3.0 and can be greater than or equal to 2.0. In still further examples, the quench ratio can be less than or equal 2.8 and can be greater than or equal to 2.0. In still further examples, the quench ratio can be equal to or less than 2.8 and can be greater than or equal to 2.2. In still further examples, the quench flow ratio Q/P can be approximately equal to 2.5, which is to say quench flow ratio Q/P is equal to or greater than 2.45 and equal to or less than 2.55. While such quench flow ratios may coincide with a small increase (e.g., less than 5% increase) in NOx production relative to the reduction of nvPM, this tradeoff can provide a net benefit to operation of gas turbine engine 10.

Figure 4:
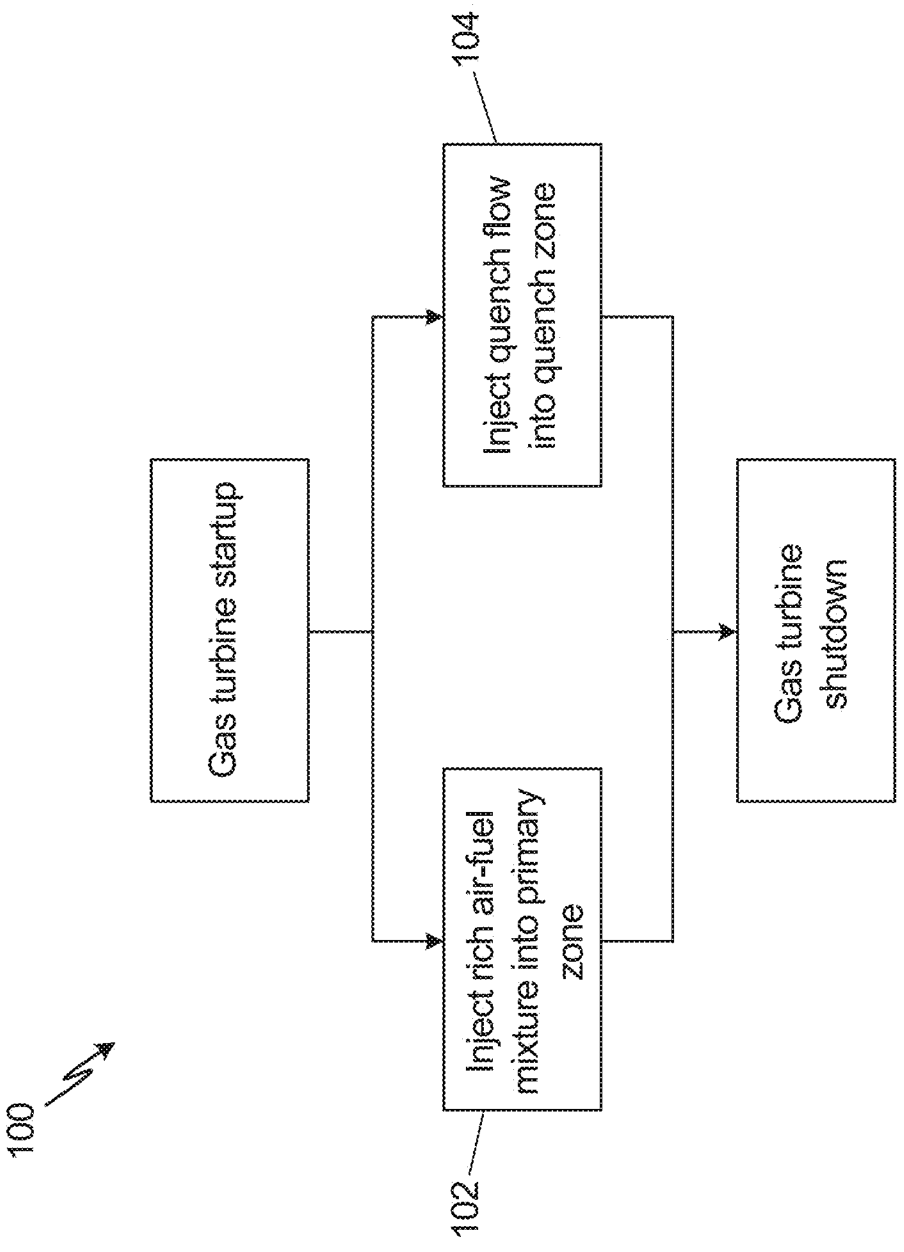
FIG. 4 is a flow chart describing a method for operating a combustor.

FIG. 4 is a flow chart describing a method for performing rich-quench-lean combustion within combustor 16. The sequence depicted is for illustrative purposes only and is not meant to limit method 100 in any way as it is understood that the portions of the method can proceed in a different logical order, additional or intervening portions can be included, or described portions of the method can be divided into multiple portions, or described portions of the method can be omitted without detracting from the described above. Method 100 includes steps 102 and 104.

In step 102, injectors 30 dispense fuel at a target fuel mass flow rate, and swirlers 68 dispense air at a target air mass flow rate into primary zone 34 to achieve a rich air-fuel mixture. In step 104, pressurized air within outer plenum dispenses through quench openings 62 into quench zone 36 at a target quench mass flow rate to achieve a lean air-fuel mixture within secondary zone 38. Step 102 and step 104 occur contemporaneously during the operation of combustor 16.

The ratio of quench flow Q to primary air flow P provided by swirlers 68 can be equal to any of the quench flow ratios described herein. In particular, the quench flow ratio Q/P can be equal to or less than 4.0 in some examples of step 104. In further examples, step 104 can include a quench flow ratio equal to or less than 3.0 and greater than or equal to 2.0. In yet further examples, step 104 can include a quench flow ratio Q/P equal to or less than 2.8 and greater than or equal to 2.0. In still further examples, step 104 can include quench flow ratio Q/P equal to or less than 2.8 and greater than or equal to 2.2. In still further examples, the quench flow ratio Q/P in step 104 can be approximately equal to 2.5.

Accordingly, as described herein, gas turbine engine 10 can be operated with a RQL combustor 16 that achieves substantially reduced nvPM relative to conventional RQL combustors while benefiting from high flame stability and lower flame temperatures within primary zone 34 associated with RQL combustion technology. Further, reduced nvPM formation is achievable with combustor 16 without requiring more complex combustion schemes such as staged combustion schemes, reducing the overall cost while improving the reliability of the combustion system.

Discussion of Possible Embodiments

The following are non-exclusive descriptions of possible embodiments of the present invention.

a Combustor for ROL Combustion

A combustor according to an example embodiment of this disclosure includes, among other possible things, a combustor shell and a plurality of fuel injectors. The combustor shell delimits a combustion chamber that includes, in axial flow series, a primary zone, a quench zone, a secondary zone, and an outlet. The combustor shell includes a plurality of opening disposed within the quench zone that fluidly connects the combustion chamber to a plenum exterior to the combustor shell to define a quench discharge area. The plurality of fuel injectors fluidly communicate with the primary zone and collectively define a net fuel discharge area and a net air discharge area. The quench discharge area and the net air discharge area are configured to provide equal to or less than 4.0 times more quench air flow than primary air flow.

The combustor of the preceding paragraph can optionally include, additionally and/or alternatively, any one or more of the following features, configurations and/or additional components.

A further embodiment of the foregoing combustor, wherein the quench discharge area and the net discharge area can be configured to provide quench flow that is at least 2.0 times the primary air flow.

A further embodiment of any of the foregoing combustors, wherein the quench discharge area and the net discharge area can be configured to provide quench flow that is equal to or less than 2.8 times the primary air flow.

A further embodiment of any of the foregoing combustors, wherein the quench discharge area and the net discharge area can be configured to provide quench flow that is at least 2.2 times the primary air flow.

A further embodiment of any of the foregoing combustors, wherein the quench discharge area and the net discharge area can be configured to provide quench flow that is approximately 2.5 times the primary air flow.

A further embodiment of any of the foregoing combustors, wherein a cross-sectional area of the combustion chamber can decrease from the primary zone towards the quench zone.

A further embodiment of any of the foregoing combustors, wherein the primary zone can be greater than or equal to eight percent and less than or equal to fifteen percent of the total volume of the combustion chamber.

A Method for Rich-Quench-Lean Combustion

A method for rich-quench-lean combustion according to an example embodiment of this disclosure includes, among other possible things, injecting a first fuel mass flow of a hydrocarbon fuel and a first air mass flow rate into the primary zone of the combustor. The first fuel mass flow rate and the first air mass flow rate define a rich fuel-air ratio. The method further includes injecting a second air mass flow rate into the quench zone of the combustor contemporaneously with injecting the first fuel mass flow rate and the first air mass flow rate. The second air mass flow rate is equal to or less than 4.0 times the first air mass flow rate.

The method of the preceding paragraph can optionally include, additionally and/or alternatively, any one or more of the following features, configurations, components, and/or additional steps.

A further embodiment of the foregoing method, wherein the second mass flow rate can be at least 2.0 times the first air mass flow rate.

A further embodiment of any of the foregoing methods, wherein the second mass flow rate can be equal to or less than 2.8 times the first air mass flow rate.

A further embodiment of any of the foregoing methods, wherein the second mass flow rate can be at least 2.2 times the first air mass flow rate.

A further embodiment of any of the foregoing methods, wherein the second mass flow rate can be approximately 2.5 times the first air mass flow rate.

A further embodiment of any of the foregoing methods, wherein the first fuel mass flow rate can be injected into the primary zone of the combustor chamber by a fuel nozzle.

A further embodiment of any of the foregoing methods, wherein the first air mass flow rate can be injected into the primary zone through a swirler surrounding the fuel nozzle.

A further embodiment of any of the foregoing methods, wherein the second air mass flow rate can be introduced into the quench zone via a plurality of openings through the combustor shell.

A further embodiment of any of the foregoing methods, wherein a cross-sectional area of the combustion chamber can decrease from the primary zone towards the plurality of openings within the quench zone.

A further embodiment of any of the foregoing methods can further include, injecting a third air mass flow rate into at least one of the primary zone, the quench zone, and the secondary zone.

A further embodiment of any of the foregoing methods, wherein the total air mass flow rate exiting the combustor can be equal to the summation of the first air mass flow rate, the second air mass flow rate, and the third air mass flow rate.

A further embodiment of any of the foregoing methods, wherein the primary zone is greater than or equal to eight percent and less than or equal to fifteen precent of a total volume of the combustion chamber.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A combustor comprising:

a combustor shell;

a combustion chamber delimited by the combustor shell comprising, in axial flow series a primary zone, a quench zone, a secondary zone, and an outlet, wherein the combustor shell includes a plurality of openings disposed within the quench zone that fluidly connects the combustion chamber to a plenum exterior to the combustor shell to define a quench discharge area; and a plurality of fuel injectors fluidly communicating with the primary zone, wherein the plurality of fuel injectors collectively defines a net fuel discharge area and a net air discharge area;

wherein the net fuel discharge area and the net air discharge area of the injectors are configured to provide a fuel-rich mixture within the primary zone for an operational range of the combustor, and wherein the quench discharge area and the net air discharge area are configured to provide equal to or less than 4.0 times more quench air flow than a primary air flow within the operational range of the combustor, and wherein a cross-sectional area of the combustion chamber decreases from the primary zone towards the quench zone, and wherein the primary zone is greater than or equal to eight percent and less than or equal to fifteen percent of a total volume enclosed by the combustor shell.

2. The combustor of claim 1, wherein the quench discharge area and the net discharge area are configured to provide quench flow that is at least 2.0 times the primary air flow.

3. The combustor of claim 2, wherein the quench discharge area and the net discharge area are configured to provide quench flow that is equal to or less than 2.8 times the primary air flow.

4. The combustor of claim 3, wherein the quench discharge area and the net discharge area are configured to provide quench flow that is at least 2.2 times the primary air flow.

5. The combustor of claim 4, wherein the quench discharge area and the net discharge area are configured to provide quench flow that is approximately 2.5 times the primary air flow.

6. A combustor comprising:

a combustor shell;

a combustion chamber delimited by the combustor shell comprising, in axial flow series a primary zone, a quench zone, a secondary zone, and an outlet, wherein the combustor shell includes a plurality of openings disposed within the quench zone that fluidly connects the combustion chamber to a plenum exterior to the combustor shell to define a quench discharge area; and a plurality of fuel injectors fluidly communicating with the primary zone, wherein the plurality of fuel injectors collectively defines a net fuel discharge area and a net air discharge area;

wherein the net fuel discharge area and the net air discharge area of the injectors are configured to provide a fuel-rich mixture within the primary zone for an operational range of the combustor, and wherein the quench discharge area and the net air discharge area are configured to provide equal to or less than 3.0 times more quench air flow than a primary air flow and at least 2.0 times the primary air flow within the operational range of the combustor, and wherein a cross-sectional area of the combustion chamber decreases from the primary zone towards the quench zone, and wherein the primary zone is greater than or equal to eight percent and less than or equal to fifteen percent of a total volume enclosed by the combustor shell.

7. The combustor of claim 6, wherein the quench discharge area and the net discharge area are configured to provide quench flow that is equal to or less than 2.8 times the primary air mass flow.

8. The combustor of claim 7, wherein the quench discharge area and the net discharge area are configured to provide quench flow that is at least 2.2 times the primary air mass flow.

9. The combustor of claim 8, wherein the quench discharge area and the net discharge area are configured to provide quench flow that is approximately 2.5 times the primary air mass flow.

10. A method for rich-quench-lean combustion within a combustor comprising, in axial flow series, a primary zone, a quench zone, and a secondary zone, the method comprising:

injecting a first fuel mass flow rate of a hydrocarbon fuel and a first air mass flow rate into the primary zone of the combustor, the first fuel mass flow rate and the first air mass flow rate defining a rich air-fuel ratio;

injecting a second air mass flow rate into the quench zone of the combustor contemporaneously with injecting the first fuel mass flow rate and the first air mass flow rate;

wherein the second air mass flow rate is greater than the first mass air flow rate and equal to or less than 3.0 times the first air mass flow rate, and wherein a cross-sectional area of the combustion chamber decreases from the primary zone towards the quench zone, and wherein the primary zone is greater than or equal to eight percent and less than or equal to fifteen percent of a combined volume of the primary zone, the quench zone, and the secondary zone.

11. The method of claim 10, wherein the second mass flow rate is at least 2.0 times the first air mass flow rate.

12. The method of claim 11, wherein the second mass flow rate is equal to or less than 2.8 times the first air mass flow rate.

13. The method of claim 12, wherein the second mass flow rate is at least 2.2 times the first air mass flow rate.

14. The method of claim 13, wherein the second mass flow rate is approximately 2.5 times the first air mass flow rate.

15. The method of claim 10, wherein the first fuel mass flow rate is injected into the primary zone of the combustor chamber by a fuel nozzle, and wherein the first air mass flow rate is injected into the primary zone through a swirler surrounding the fuel nozzle.

16. The method of claim 15, wherein the second air mass flow rate is introduced into the quench zone via a plurality of openings through the combustor shell, and wherein a cross-sectional area of the combustion chamber decreases from the primary zone towards the plurality of openings within the quench zone.

17. The method of claim 10, further comprising:

injecting a third air mass flow rate into at least one of the primary zone, the quench zone, and the secondary zone, wherein the total air mass flow rate exiting the combustor is equal to the summation of the first air mass flow rate, the second air mass flow rate, and the third air mass flow rate.

* * * * *